United States Patent [19]

Alphonse et al.

[11] 4,197,921

[45] Apr. 15, 1980

[54] ANTI-REFLECTIVE ACOUSTIC WAVEFRONT REFRACTION ELEMENT

[75] Inventors: Gerard A. Alphonse, Princeton; William C. Saunders, Jr., Trenton, both of N.J.

[73] Assignee: RCA Corporation, New York, N.Y.

[21] Appl. No.: 894,012

[22] Filed: Apr. 6, 1978

[51] Int. Cl.[2] .................... G10K 11/00; G10K 11/06; G01S 3/80

[52] U.S. Cl. .................................... 181/176; 367/150

[58] Field of Search ................ 181/176, 175; 340/8 L, 340/8 MM, 8 LF

[56] References Cited

U.S. PATENT DOCUMENTS

| | | | |
|---|---|---|---|
| 3,618,696 | 11/1971 | Hurwitz | 181/176 |
| 3,687,219 | 8/1972 | Langlois | 181/176 |
| 3,866,711 | 2/1975 | Folds | 181/176 |
| 3,903,498 | 9/1975 | Jacobs et al. | 340/8 MM |
| 3,913,061 | 10/1975 | Green | 181/176 |

FOREIGN PATENT DOCUMENTS

| | | | |
|---|---|---|---|
| 1432632 | 4/1976 | United Kingdom | 181/176 |

*Primary Examiner*—Stephen J. Tomsky
*Attorney, Agent, or Firm*—George J. Seligsohn; Samuel Cohen

[57] ABSTRACT

The fabrication of ultrasonic-wave lenses and prisms using low-surface tension (poor adhesion) polyalkene sheet (such as polyethylene) as an impedance-matching quarter-wave anti-reflective layer is made possible by the use of certain very low surface-tension cements.

13 Claims, 8 Drawing Figures

Fig.3A.
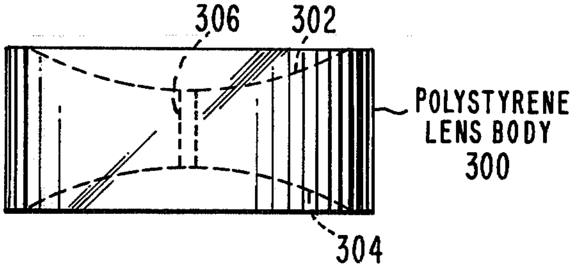
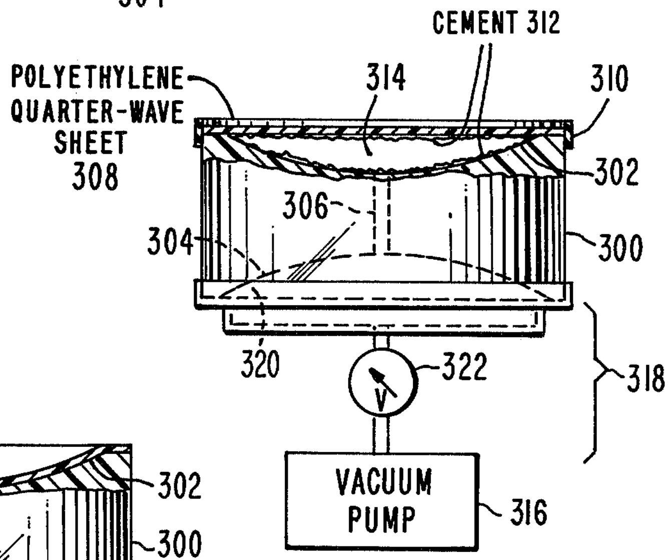
Fig.3B.
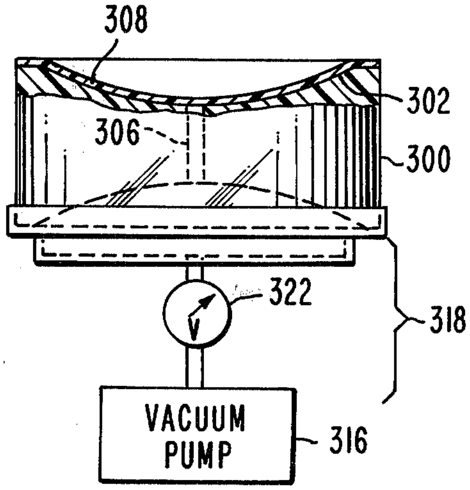
Fig.3C.
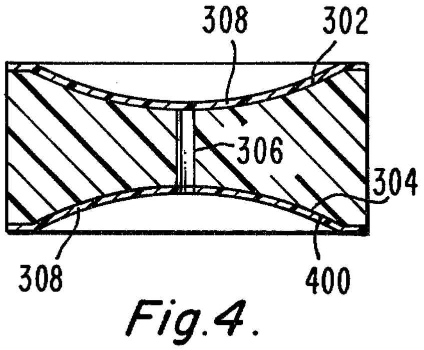
Fig.4.

ANTI-REFLECTIVE ACOUSTIC WAVEFRONT REFRACTION ELEMENT

This invention relates to an anti-reflective acoustic wavefront refraction element, such as a lens or a prism, adapted to be immersed in a medium for propagating an ultrasonic wave of a given wavelength.

Ultrasonic imaging systems are known in the art. In such systems, the ultrasonic-wave propagating medium is usually primarily composed of water. An example of such an ultrasonic imaging system, which is particularly useful for medical diagnostic purposes, is disclosed in the copending U.S. patent application Ser. No. 766,564, filed Feb. 7, 1977, by Mezrich et al., and assigned to the same assignee as the present invention.

An ultrasonic imaging system usually employs one or more piezoelectric transducers and one or more acoustic wavefront refraction elements disposed within the propagating medium. An acoustic wavefront refraction element must inherently be composed of a material having an acoustic impedance substantially different from that of the surrounding propagating medium. In practice, a refraction element is most often composed of a plastic body having an acoustic impedance substantially different (a range of 2.2 to $3.5\times10^6$ kg/m$^2$ sec) from that of water ($1.48\times10^6$ kg/m$^2$ sec), in which it is immersed. Due to this substantial difference in acoustic impedance, unwanted reflection of ultrasonic wave energy takes place at each boundary between the refraction-element plastic body and the water propagating medium. It is known that a refraction element may be made anti-reflective by placing at such a boundary a quarter-wave thick material having an acoustic impedance close to the geometric mean of that of the medium and of that of the plastic body. These requirements are met by certain polyalkene plastic sheet materials, such as polyethylene and polypropylene. The difficulty is that such polyalkenes exhibit an extremely low surface tension, which, in the past, prevented such an anti-reflective acoustic wave front refraction element from being successfully implemented.

The present invention overcomes this problem by cementing a layer of such sheet materials to the entire area of a surface of the plastic body with a type of cement which is not adversly affected by the extremely low surface tension of the sheet material and which cement has a negligible effect on the acoustic wave front refraction characteristic of the resulting anti-reflective acoustic wave front refraction element.

In the Drawings:

FIGS. 3A, 3B, 3C illustrate successive steps of a method for fabricating an anti-reflective acoustic lens having at least one concave surface;

FIG. 4 illustrates a completely fabricated antireflective acoustic lens having two concave surfaces.

Figure 1:
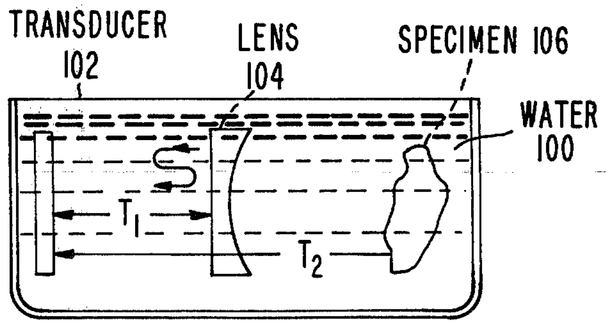
FIG. 1 is a schematic illustration of a reflective acoustic imaging system.

Referring to FIG. 1, there is shown a tank of water 100 in which is immersed transducer 102, lens 104 and specimen 106. For the purposes of this discussion, it is assumed that lens 104 is situated half-way between transducer 102 and specimen 106.

Figure 2:
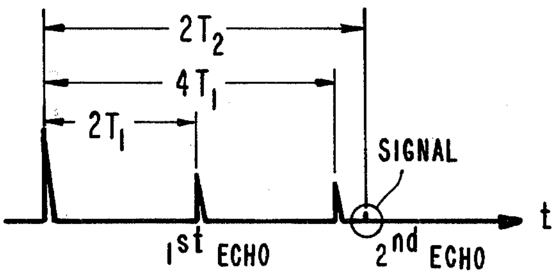
FIG. 2 is a timing diagram useful in explaining the operation of the imaging system of FIG. 1.

Transducer 102 generates ultrasonic pulses, that are transmitted to specimen 106 through lens 104, and then receives echo-signal information from specimen 106 which is transmitted back to transducer 102 through lens 104. The time required for an ultrasonic pulse to travel between transducer 102 and lens 104 is $T_1$, while the time required for ultrasonic pulse to travel between transducer 102 and specimen 106 is $T_2$. Unfortunately, due to the substantial difference in acoustic impedance between that of lens 104 and that of water 100, multiple unwanted reflections of ultrasonic wave energy take place from lens 104. More specifically, as shown in FIG. 2, a total time interval of 2 $T_2$ exists between the generation of an ultrasonic pulse from transducer 102 and the receipt thereby of an information signal from specimen 106. However, in the mean time, a first unwanted echo from lens 104, occurring at time $T_1$, arrives back at transducer 102 at time 2 $T_1$. Transducer 102 (which is not impedance-matched to the propagating medium) reflects a substantial portion of this ultrasonic wave energy back toward lens 104, a second unwanted echo at time 3 $T_1$ is reflected back to and received by transducer 102 at time 4 $T_1$. However, time 4 $T_1$ is substantially equal to 2 $T_2$, the time that the desired signal is received. As is known in the art, an acoustic imaging system usually employs a range gate (which is opened only during the time iterval that an information signal arrives back at the transducer) to minimize the effect of unwanted reflection. However, as described above, the second unwanted interval echo arrives at transducer 102 coincident with the arrival of the desired information signal (when the range gate is open).

A typical reflection coefficient at the lens is 24 percent. A typical conversion efficiency at an unwanted transducer is 10 percent, so that most of the noise is reflected back to the lens. At a time equal to 4 $T_1$, the noise voltage from the multiple reflections 108 has an amplitude of about 5.4 percent, with respect to that of the originally generated pulse, while the amplitude of the desired signal is typically in the order of only a 0.16 percent. In a more complex ultrasonic imaging system, the situation is further aggravated by the fact that there may be several imaging elements, each with two surfaces. It is, thus, very important to minimize the undesired reflected noise signal detected at transducer 102.

Preferably, an acoustic refractive element, such as lens 104, should be composed of polystyrene, because polystrene exhibits low transmission losses relative to other similar plastics. (The acoustic impedance of polystyrene is $2.397\times10^6$ kg/m$^2$ sec). However, it should be understood, that an acoustic refraction element, such as lens 104, may alternatively be composed of various other similar plastics (such as crystalmethyl methacrylate polycarbonate, etc.), having a certain acoustic impedance in a range of 2.2 to $3.5\times10^6$ kg/m$^2$ sec. Because it is the preferred material, for illustrative purposes, it is assumed that the body of the refraction element is composed of polystyrene.

Water, itself, has an acoustic impedance of $1.48\times10^6$ kg/m$^2$ sec. Water-based fluids, such as salt water, human body fluid, etc., all have an acoustic impedance, close to that of water, in the order of $1.5\times10^6$kg/m$^2$ sec.

Ideally, in order to match polystyrene to water, a quarter-wave impedance material should have an acoustic impedance exactly equal to the geometric mean between the acoustic impedance of polystyrene and the acoustic impedance of water (this geometric mean turns out to be $1.88\times10^6$ kg/m$^2$ sec.). In practice, acceptably low reflection is still obtained so long as the acoustic impedance of the quarter-wave material is in the range of 0.5 to 1.5 of this geometric mean. Further, the quarter-wave material should have an effective thickness which is exactly equal to a quarter-wave (i.e., a thickness which is equal to one-quarter the distance occupied by one cycle of ultrasonic wave energy traveling threrin at the velocity of sound in the quarter-wave material). In practice, a sufficiently low reflection is obtained so long as the effective acoustic thickness of the quarter-wave material is in the range of $\frac{1}{8}$-$\frac{3}{8}$ wavelengths. Specifically, so long as the acoustic impedance and the effective acoustic thickness of the quarter-wave material, respectively, do not vary more than 50 percent from their ideal values, the amplitude of unwanted reflection is no more than 20 percent of the amplitude in the absence of any quarter-wave layer.

Low-density polyethylene has an acoustic impedance of $1.885 \times 10^6$ at 25° C., which is very close to the ideal quarter-wave acoustic impedance for matching polystryrene to water. Further, at a typical ultrasonic frequency of 1.5 MHz, standard 10 mil. (0.01 inch) polyethylene sheet has an effective acoustic thickness well within the aforesaid range. Unfortunately, polyethylene sheet exhibits very poor adhesion and, therefore, is very difficult to successfully bond to another material. This poor adhesion results from the fact that polyethylene exhibits relatively low surface tension (31 dynes/cm) compared to the surface tension exhibited by such materials as metals, ceramics, and glasses (more than 100 dynes/cm). This low surface tension of polyethylene means that it has poor surface wettability, resulting in the poor adhesion. In the past, in order to bond the polyethylene to another surface (for any purpose) it has been necessary to increase its surface tension by treating the surface. Surface treatment is either chemical, electrical or by means of oxidizing flame. In any case, the effect of the treatment is to oxidize the surface, and hence induce a certain amount of polar groups thereon, which polar groups are responsible for substantially increasing the otherwise low surface tension of polyethylene. Once the surface is treated, it can be bonded to another material by certain types of adhesive, such as contact cement. Unfortunately, these types of adhesives are not suitable for making bonds between polyethylene acoustic quarter-wave layers and a polystyrene body acoustic refraction element because the presence of such cements themselves cause impedance mismatching. More specifically, the presence of a cement will cause mismatching unless it either has (1) an acoustic impedance substantially the same as that of the one of the two bonded materials (polystyrene or polyethylene) or (2) forms a film of negligible thickness with respect to a wavelength of ultrasonic wave energy propagated therethrough. The acoustic impedance of the type of cements usually employed to bond treated surface of polyethylene to a polystyrene surface has an acoustic impedance which is substantially different than that of both polystyrene and polyethylene and, further, has a viscosity so high that it cannot form a film that is so thin as to be negligible with respect to the wavelength of ultrasonic wave energy. It is for this reason, that, in the past, it has not been possible to implement an anti-reflective acoustic wavefront refraction element.

The present invention uses as a cement either (a) a low surface tension fluid in which the plastic sheet (polyethylene) is soluble or (b) a "liquid" plastic containing low surface tension solvents (less than 22 dynes/cm). It has been found that certain halocarbons (bromofluorocarbons, chloroflurocarbons) are good examples of low surface tension fluids which dissolve polyethylene, polystyrene, crystal methylmethacrylate and other plastics in various other plastics in various degrees. Good examples of a liquid plastic containing low surface tension solvents are various urethane plastics dissolved in esterified alcohols obtainable commercially in various forms of varnishes.

The ideal halocarbon or liquid plastics are those whose acoustic impedance is close to that of either polystrene or polyethylene. Suitable halocarbons (manufactured by Halocarbon Products Co., in Hackensack, N.J.), are "470" fluid and "BFC" fluid. The "470" fluid has an acoustic impedance close to that of the polystyrene, while the "BFC" fluid has an acoustic impedance close to that of polyethylene. A suitable liquid plastic is the commercial varnish product called "VARATHANE" (manufactured by Flecto, in Oakland, Calif.), because the acoustic impedance of "VARATHANE" is close to that of polyethylene. However, in the present invention a liquid-plastic varnish, such as "VARATHANE" is not used conventionally as a "finish", but, instead is used as a cement.

Referring now to FIGS. 3A, 3B, and 3C, there is shown a method for covering at least one fact of a polystyrene lens body with a quarter-wave sheet of polyethylene (which requires no surface treatment). More specifically, as shown in FIG. 3A, polystyrene lens body 300 comprises oppositely-disposed first concave surface 302 and second concave surface 304. Hole 306, preferably having a diameter of less than an acoustic wavelength (e.g., a diameter of 0.3 mm) is drilled in the center of lens body 300. As shown in FIG. 3B, a quarter-wave sheet 308 (e.g. one 10 mil. or 0.25 mm thick) of polyethylene is stretched securely in rigid frame 310 over first concave surface 302. Prior to this, concave surface 302 and the inner surface of sheet 308 are both cleaned with solvents and are generously sprayed with an appropriate cement 312, (e.g. "VARATHANE"). The space 314 between sheet 308 and first concave surface 302 forms an upper chamber which communicates with vacuum pump 316 through hole 306 and coupling means 318. Coupling means 318, cooperates with lower concave surface 306 to form a lower chamber 320. Coupling means 318 includes controllable valve 322 situated between lower chamber 320 and vacuum pump 316.

Initially, valve 322 is in its closed position. As valve 322 is opened gradually, sheet 308 is forced by the vacuum in space 314 to deform, stretch and follow the curvature of the first concave surface 302. The rate of deforming is controlled with valve 322. While sheet 308 is deforming, its top surface is rubbed and pressed with the fingers in order to prevent the formation of air bubbles and trapped cement pockets (blisters). The excess cement flows to lower chamber 320 through hole 306. The result of deforming sheet 308 is shown in FIG. 3C. After sheet 308 is fully deformed, as shown in FIG. 3C, vacuum pump 316 is left on for about 24 hours, during which time the cement dries. Finally, any excess material is removed. The final result is a strong, smooth permanent anti-reflection layer 308 held on to first concave surface 302 by the outside air pressure of about one atmosphere, as well as by a film of cement (not shown).

Sheet 308 covers one end of hole 306, as shown in FIG. 3C. In order to provide a second anti-reflection layer on second concave surface 304, it is necessary to drill through the center of sheet 308 to extend hole 306 therethrough. Then body 300 may be turned over and the process described in connection with the FIGS. 3B and 3C may be repeated to produce the finshed acoustic wavefront refraction element, shown in FIG. 4, having anti-reflective layers attached to both the first and second concave surfaces thereof. The presence of the hole has no effect on the performance of the lens other than to slightly reduce its aperture.

Specifically, as shown in FIG. 4, the finished lens comprises lens body 300, center hole 306, quarter-wave sheet 308 covering first concave surface 302, and second quarter-wave sheet 400 covering the second concave surface 304.

Figure 5A:
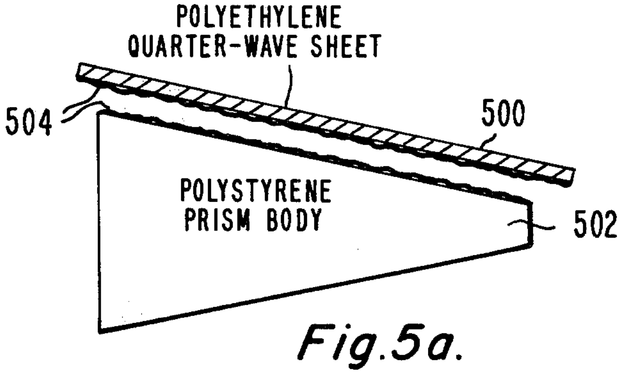
FIGS. 5A and 5B illustrate the fabrication of an anti-reflective prism in accordance with the principles of the present invention.
Figure 5B:
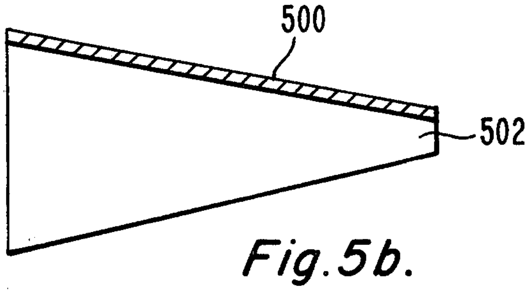

Acoustic refraction elements having one or more flat surfaces, such as a prism, may also be fabricated with an anti-reflection layer. Specifically as shown in FIGS. 5A, a polyethylene quarter-wave sheet 500 may be bonded to polystyrene prism body 502 by an appropriate cement 504, having proper surface tension and impedance characteristics, as discussed above, to provide the finished product of FIG. 5B. It is not necessary to use the arrangement of FIG. 3 to bring the flat surfaces to be bonded into contact.

The testing of anti-reflective acoustic wavefront refraction elements, such as prisms and lenses, fabricated, in accordance with the principles of the present invention, of polystryene bodies covered with polyethylene quarterwavelength layers have been found to have a measured reflection coefficient in a water tank of 0.67 percent over a bandwidth of 30 percent of the mid-frequency. This is in improvement by a factor of 36 over bare polystyrene in contact with water. Further, the strength of the bond between polyethylene and polystyrene obtained employing the techniques of the present invention has been found to be stronger than that obtained by any state-of-the-art bonding method, as measured by comparision tests.

The present invention is of a benefit in bonding any kind of polyalkene sheet material having a surface tension in the range of 25–45 dynes/cm.

What is claimed is:

1. An anti-reflective acoustic wavefront refraction element having predetermined refractive properties when immersed in a medium for propagating an ultrasonic wave of a given wavelength, said medium having an acoustic impedance in the order of $1.5 \times 10^6$ kg/m$^2$ sec, said element itself comprising:

(a) a plastic body composed of a first material having a first certain acoustic impedance in the range of 2.2 to $3.5 \times 10^6$ kg/m$^2$ sec, said plastic body having a given size and shape that determines said refractive properties of said element, (b) a plastic layer composed of a second material having a second certain acoustic impedance which is in a range of 0.5 to 1.5 of the geometric mean of that of said body, and said medium, said layer having a certain acoustic thickness in the range of $\frac{1}{8}$–$\frac{3}{8}$ of said given wavelength, said second material being a polyalkene exhibiting a surface tension, in the range of 25–45 dynes/cm, which is less than that exhibited by said first material, and (c) a cement exhibiting a substantially smaller surface tension than that of said polyalkene to effect the wetting thereof, which cement cements said layer to the entire area of a surface of said plastic body.

2. The element defined in claim 1, wherein said second material is a polypropylene.

3. The element defined in claim 1, wherein said second material is polyethylene.

4. The element defined in claim 3, wherein said cement is a halocarbon.

5. The element defined in claim 4, wherein said cement is a plastic soluble in a solvent exhibiting a surface tension no greater than 22 dynes/cm, and said polyethylene exhibits a surface tension of substantially 31 dynes/cm.

6. The element defined in claim 5, wherein said cement is a urethane plastic which is soluble in an esterified alchol.

7. The element defined in claim 1, wherein said cement has a thickness relative to said given wavelength insufficient to significantly affect ultrasonic wave propagation therethrough.

8. The element defined in claim 1, wherein the acoustic impedance of said cement is substantially the same as one of said first and second acoustic impedances.

9. The element defined in claim 1, wherein said first material is polystyrene.

10. The element defined in claim 1, wherein said shape of said plastic body is that of a lens having at least one concave surface, and wherein said layer is cemented to said one concave surface.

11. The element defined in claim 10, wherein said lens has two oppositely-disposed concave surfaces, wherein said layer is cemented to one of said two concave surfaces and wherein said element further includes a second plastic layer composed of said second material, said second layer having a certain acoustic thickness in the range of $\frac{1}{8}$–$\frac{3}{8}$ of said given wavelength, and a cement having negligible effect on the acoustic wavefront refraction characteristic of said device cementing said second layer to the other of said two concave surfaces.

12. The element defined in claim 11, wherein said certain acoustic thickness of said first-mentioned and said second layers are the same as each other.

13. The element defined in claim 12, wherein said first and second layers are each composed of 10 mil polyethylene sheet

* * * * *